May 20, 1941.    W. E. URSCHEL ET AL    2,242,557
APPARATUS FOR CUTTING MATERIALS
Filed Aug. 9, 1939    4 Sheets-Sheet 1

INVENTORS.
BY William E. Urschel
Joe Richard Urschel
Cox & Moore    ATTORNEYS.

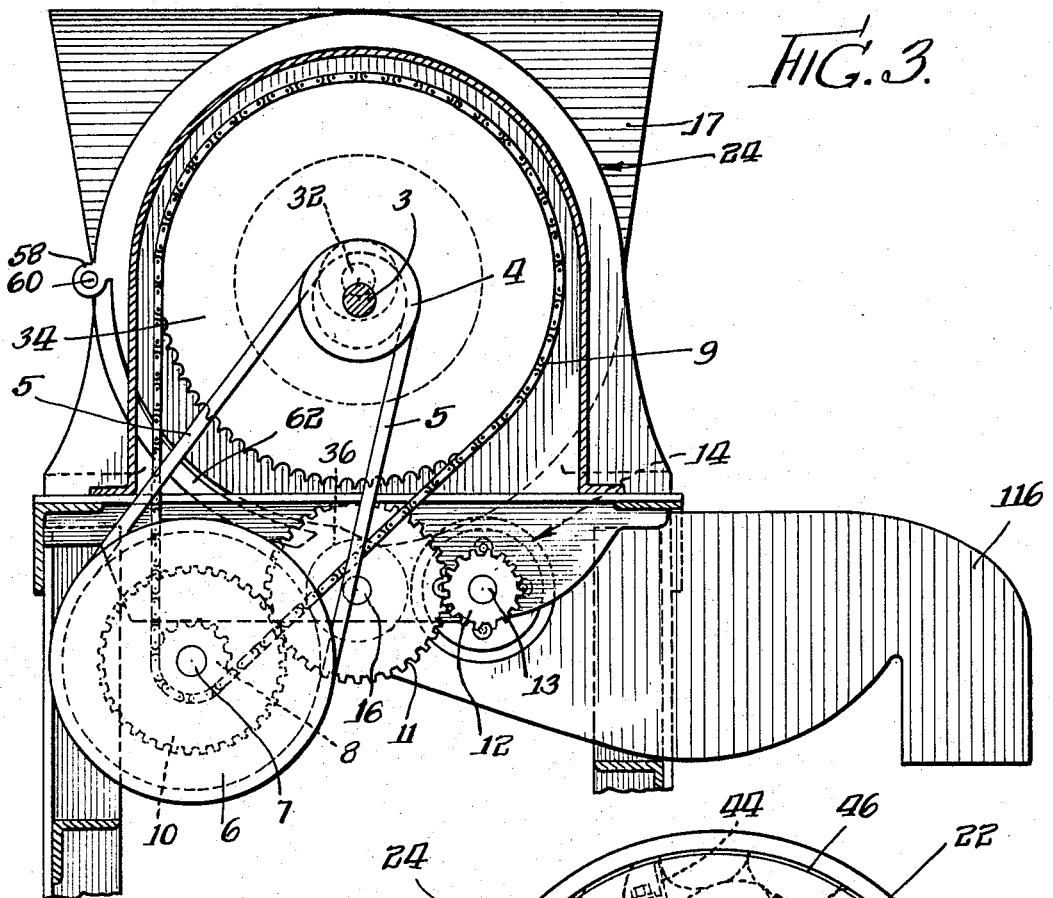
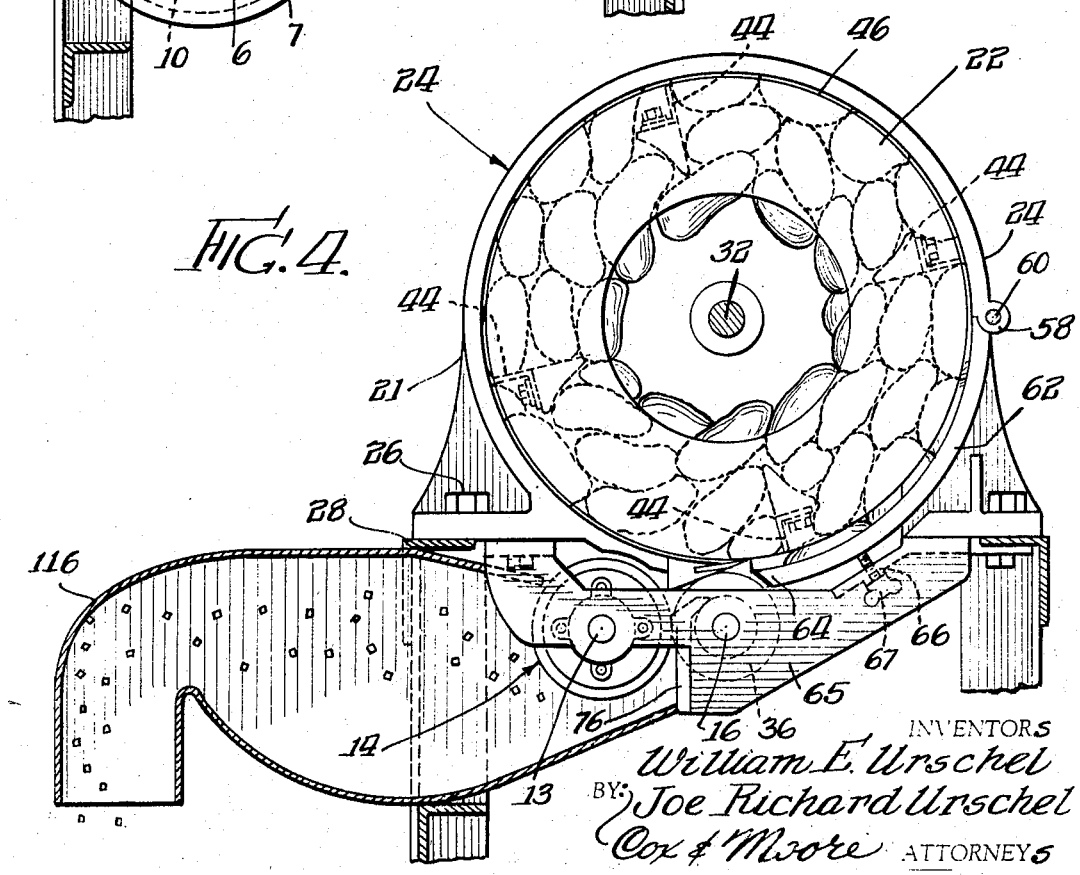

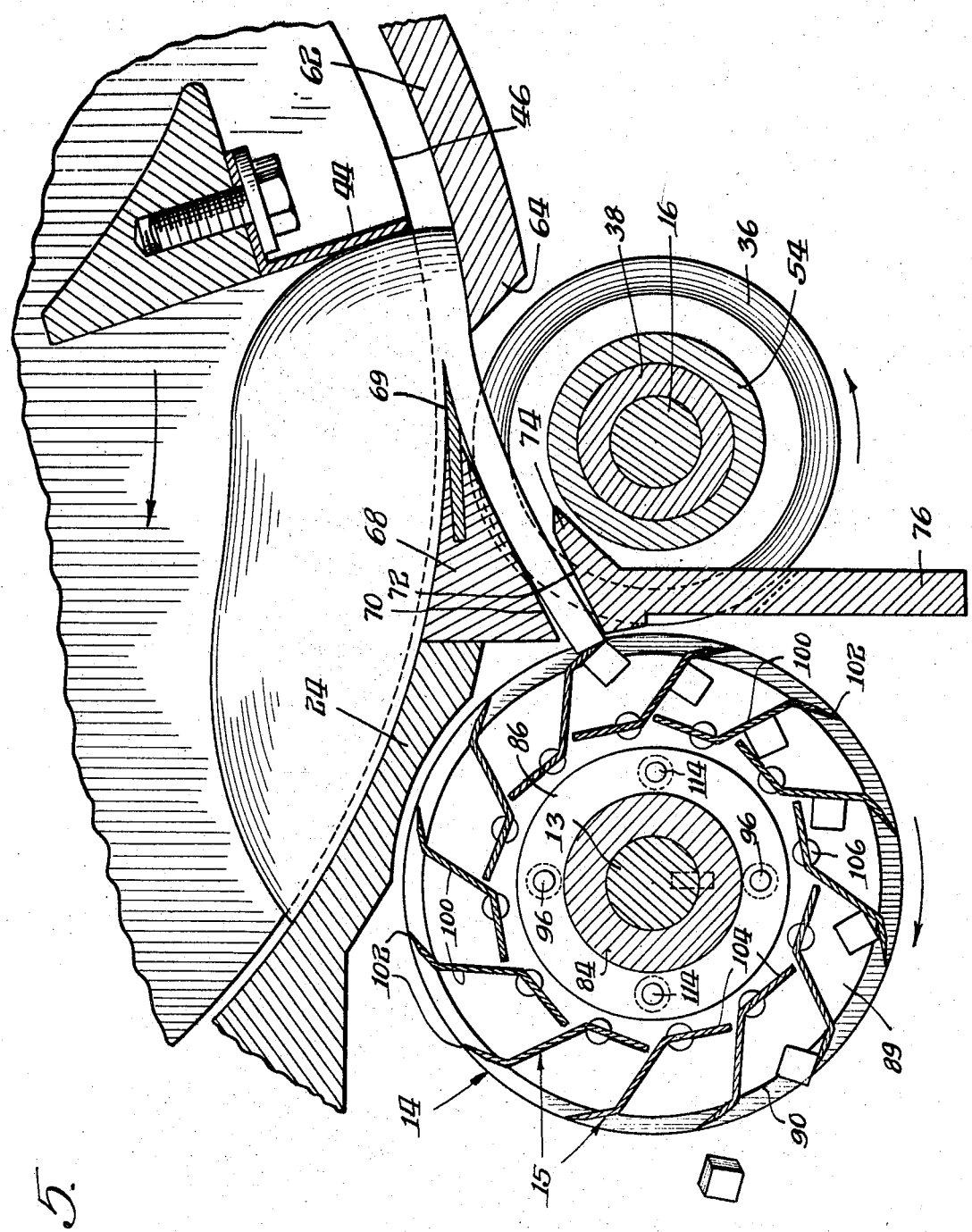

May 20, 1941.   W. E. URSCHEL ET AL   2,242,557
APPARATUS FOR CUTTING MATERIALS
Filed Aug. 9, 1939   4 Sheets-Sheet 4
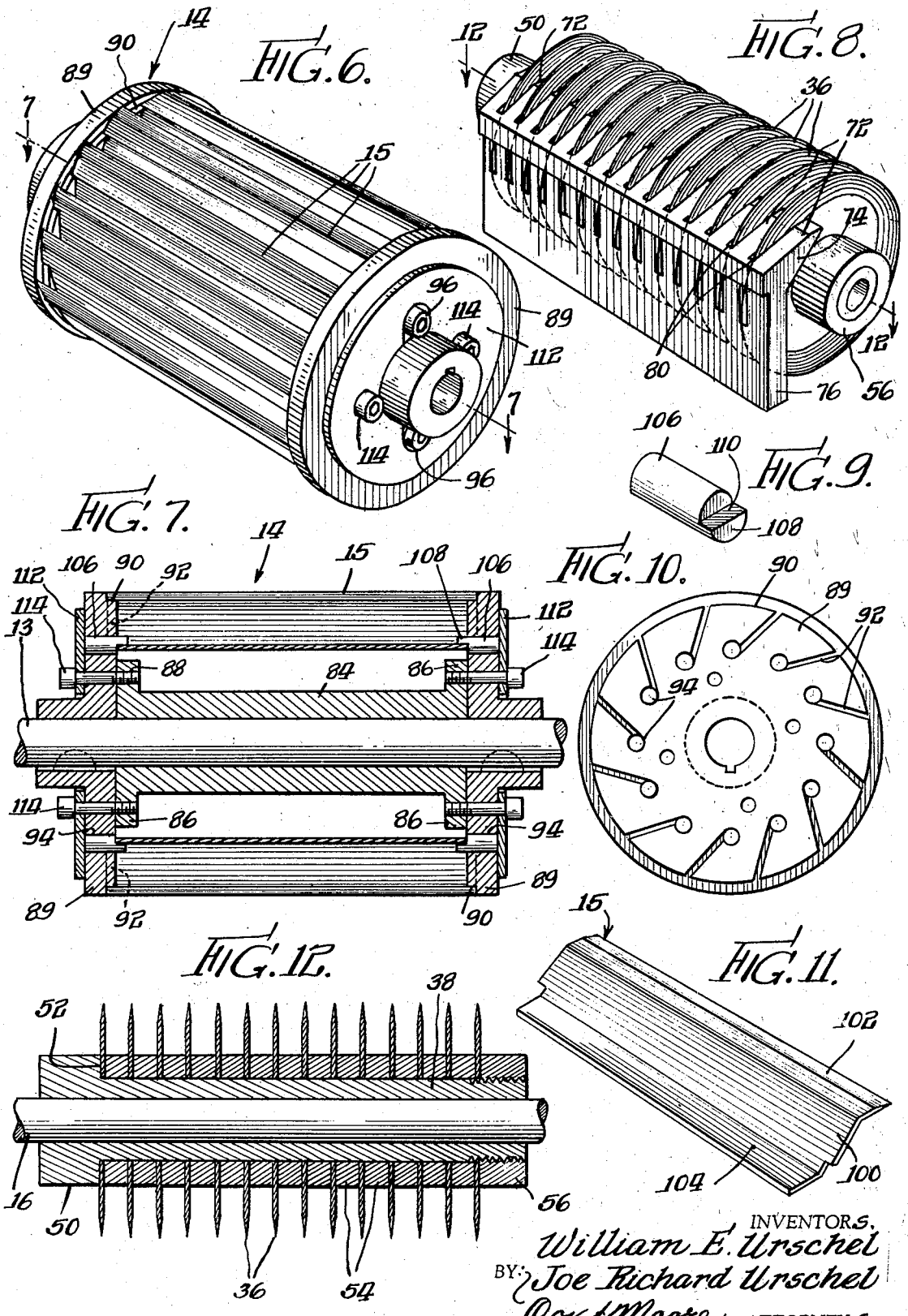
INVENTORS.
William E. Urschel
BY Joe Richard Urschel
Cox & Moore  ATTORNEYS Patented May 20, 1941

2,242,557

UNITED STATES PATENT OFFICE 2,242,557

APPARATUS FOR CUTTING MATERIALS

William E. Urschel and Joe Richard Urschel, Valparaiso, Ind.

Application August 9, 1939, Serial No. 289,264

22 Claims. (Cl. 146—78)

This invention relates to the dicing of substances such as fruits and vegetables.

Among the objects of the present invention are to provide a dicing machine constructed and arranged so that the substance to be diced is presented to a series of spaced apart cutters, certain of which are propelled in such a manner that in the presentation of the substance to the successive cutters, the next succeeding cutting operation will be initiated before the completion of the prior cutting operation and in such a manner that one or more of the cutters effects a propelling operation upon the substance itself whereby not only to effect a more speedy dicing of the substance, but also to eliminate the formation of short undiced ends of the substances to be cut and whereby also to effect a more accurate and symmetrical dicing of a substance and in a continuous manner; to provide a method and apparatus for dicing substances wherein the substances centrifuge across a stationary slicing knife which is adapted to cut a series of constantly flowing slices from the substance and wherein before the formation of the completed slice, a part of the slice during its formation is fed to a plurality of transversely disposed propelled cutters which form the slices into strips while at the same time propelling the strips forwardly at a slightly greater speed than the slice is propelled by the centrifugal means and wherein subsequently and while the strips are thus propelled they are presented to a high speed rotary dicing device arranged arcuately to form equal, symmetrically formed cubes or diced shapes of desired dimensions, and wherein said last-mentioned cutting means is arranged to project the diced shapes in a predetermined direction away from the line of feed to a remote point; to provide a dicing machine of very large capacity and adapted to operate at high speed which will positively and sharply cut the substances into cubes without mashing or otherwise deforming the cubes and in a manner to project the cubes from the cutting zone; to provide a high speed rotary dicing cutter adapted to dice the strips into cubes wherein the knives are arranged not only to act as buffers to prevent injurious impact to the diced substance during the high speed cutting, but wherein the dicing is effected without tearing or pulling the substance during the cutting operation; to provide a dicing cutter wherein the blades are constructed and arranged so that each succeeding knife will slice off an exact predetermined size of cube from the formed strip; to provide a dicing cutter wherein the knives are arranged so as to pull upon the strip as the strip is being formed, said pulling being accomplished upon the strip at the same rate of speed at which the strip is moving, thereby to pull the strip out of the strip cutter and position it for the dicing cutter; to provide a dicing machine wherein a material is centrifuged to a stationary slicing knife which forms the substance into successive slices and wherein each slice during its formation is fed to rotary cutters which form the slice into strips, and which cutters also propel the formed strips at a greater speed than that imparted by the centrifugal means and wherein also the formed strips are thereafter fed to a series of transversely operating or rotating dicing cutters for forming the strips into cubes or other shapes, and wherein the dicing cutters rotate at sufficient speed to likewise propel the strips during their formation at an even or greater speed than that imparted to the strips by the strip forming cutter, whereby the substance is formed into slices, then strips, and then cubes or other shapes while being fed in a continuous manner at high speed whereby to provide large capacity, speed of operation and efficiency in the formation of the cubes; to provide a novel manner of cutting strips of material into relatively short sections wherein a strip of material is translated at relatively high speed and wherein, as the short sections are formed, they are received in a manner to prevent impact, whereby to prevent injury to the sections, and are discharged away from the zone of cutting; to provide a cutter blade adapted to move at high speed across a translated strip of material to cut a section therefrom wherein the cutter blade has associated therewith a section receiving surface arranged to prevent impact thereagainst or against any other hard surface for discharging the cut section away from the zone of cutting; to provide a cutting method and apparatus wherein a cutter rotates at relatively high speed of the order of 1800 R. P. M. across a translated strip of substance likewise moving at relatively high speed and wherein the cutting means is provided with a cut section receiving surface likewise moving at high speed and arranged at an inclination with respect to the cutter blade, whereby slidably to receive without impact the cut section, to gradually arrest movement of said section therealong and/or thereafter, under centrifugal force, to impart accelerated movement to said cut section in a reverse direction along said surface as the surface moves arcuately, whereby to discharge the cut section at a remote point and at an angle from the zone where it was cut; to provide these and other objects of invention as will be apparent from a perusal of the following specification when taken in connection with the accompanying drawings, wherein:

Fig. 3 is a vertical sectional view taken on the line 3—3 of Fig. 2;

Fig. 4 is a vertical sectional view taken on the line 4—4 of Fig. 2;

Fig. 5 is a fragmentary sectional view taken on the line 5—5 of Fig. 2 and illustrating the cutting knives in operation;

Fig. 6 is a perspective view of the cubing knives;

Fig. 7 is a longitudinal sectional view taken on the line 7—7 of Fig. 6;

Fig. 8 is a perspective view of the stripping knives and their guards;

Fig. 9 is a perspective view of a pin which cooperates with the cubing knives to lock them in position;

Fig. 10 is a vertical view of one of the end plates which supports the cutting knives;

Fig. 11 is a perspective view of one of the knives;

Fig. 12 is a longitudinal sectional view taken on the line 12—12 of Fig. 8.

Figure 1:
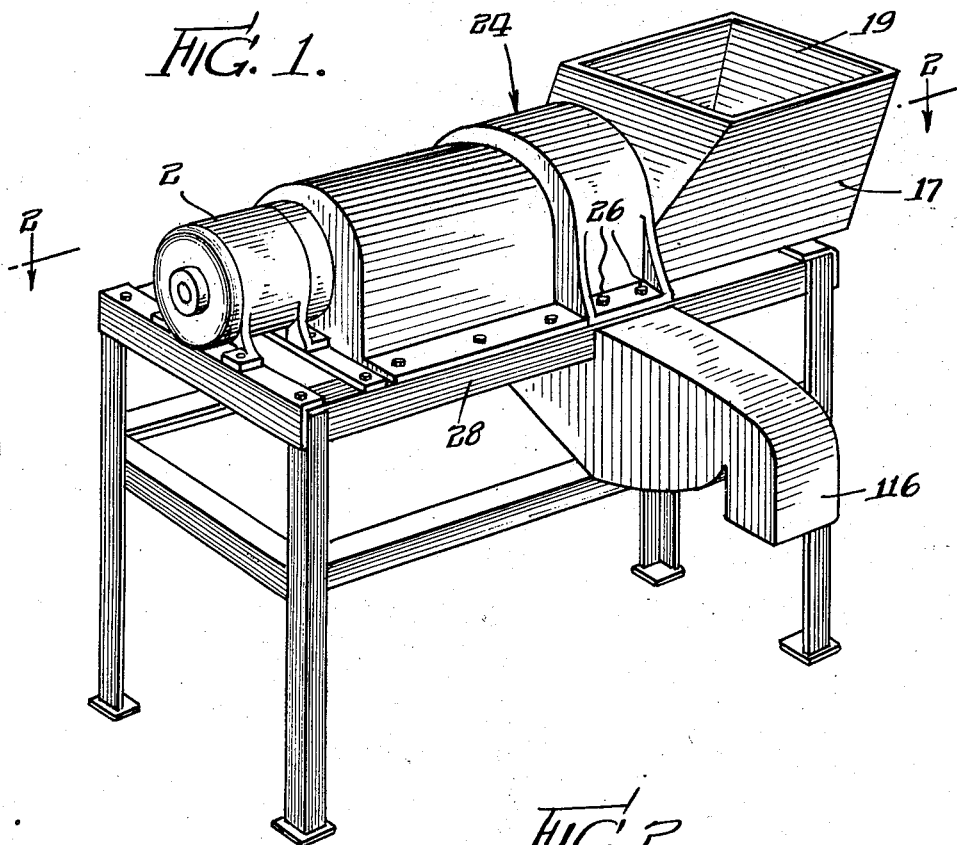
Fig. 1 is a perspective view of one form of the machine for carrying out the invention.
Figure 2:
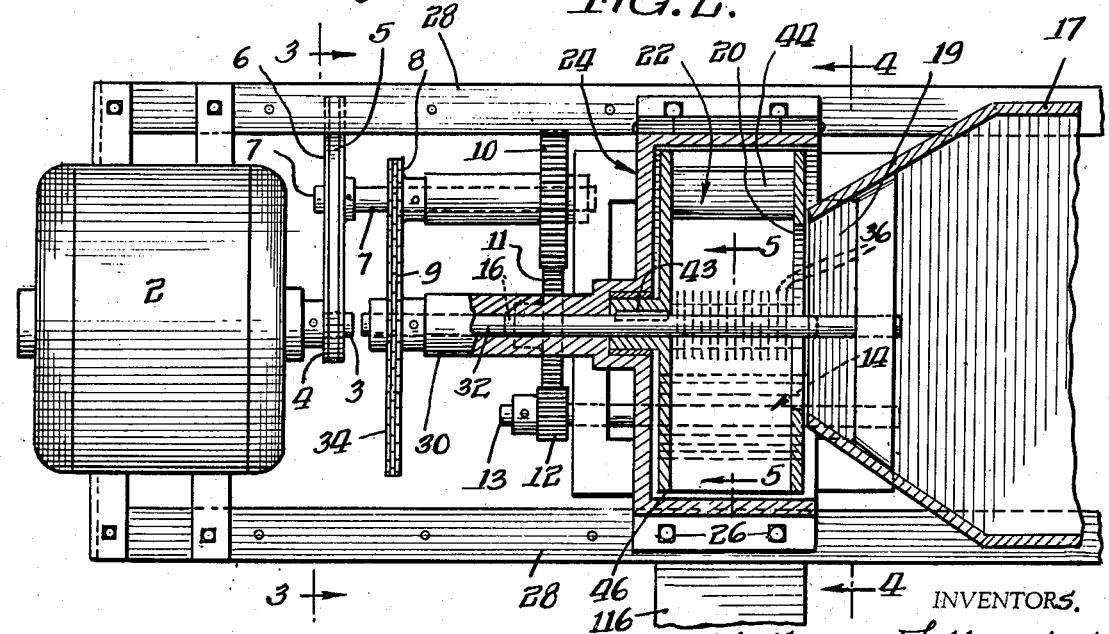
Fig. 2 is a plan sectional view taken on the line 2—2 of Fig. 1.

The present application is a continuation in part of the invention disclosed and claimed in the application Serial No. 195,846, filed March 14, 1938.

The invention preferably comprises a support for the machine, herein shown as a bench-like standard of any desired construction or form, upon which is mounted the source of power herein shown as an electric motor 2 having a drive shaft 3 upon which is a pulley 4 driving by means of a belt 5 a pulley 6 on a parallel shaft 7. The shaft 7 has mounted thereon a sprocket gear 8 driving a sprocket chain 9 hereinafter described. In addition the shaft 7 has thereon a gear 10 adapted to drive an intermediate gear 11 on a shaft 16, which in turn drives a smaller gear 12 on a shaft 13 on which shaft is mounted a cylindrical member 14, about which are clamped in position a plurality of parallel knives 15 which are adapted to be rotarily driven. A suitable locking means is provided for holding the parallel cube cutters 15 in position on the shaft 13.

Likewise mounted upon the bench-like frame of the machine is a stationary hopper 17 having an open top adapted to receive the substance to be diced such as potatoes, fruits or vegetables. This hopper has an open mouth 19 adapted to discharge into a parallel registering aperture 20 of a rotatable drum 22 mounted within a similarly formed stationary housing 24 bolted as at 26 to the horizontal frame portions 28 of the bench. This housing 24 is provided with an off-set sleeve 30 forming a bearing for a shaft 32 on the outer end of which is a sprocket wheel 34. It will be understood that the electric motor drives the shaft 3, which in turn through the belt drives the shaft 7, which in turn through the sprocket 8 and sprocket chain 9 drives the large sprocket wheel 34 on the shaft 32.

Suitable housings shown in Fig. 1 enclose the drive between the motor and the cutters. The shaft 32 has splined thereto as at 43 the drum-like member 22. This drum-like member in turn is provided with internal inwardly projecting abutments 44, there being four shown which on rotation of the drum 22 when the same is filled with potatoes or other fruit or vegetable substances are centrifuged about the parallel axis 32. In this connection it is to be noted that the periphery of the drum as at 46 is open except at the pusher elements 44 whereby the potatoes or other substances centrifuge within the drum slide continuously and freely about the inner smooth wall of the stationary casing member 24

The shaft 16 driven by the gear 11 as shown clearly in Figs. 3 and 5, is provided with a plurality of parallel disposed, spaced apart cutting disc knives 36. To this end, the shaft 16 is provided with a sleeve 38 and one end 50 forming a peripheral seat or shoulder 52. A gang of disc-cutting blades 36 are coaxially mounted upon the tubular sleeve 38 and spaced by the annular spacers or washers 54. It will be noted that the tubular member 38 is provided with an integral radially extending shoulder 52 at one extremity for maintaining the cutters and spacing members in spaced relation. The cutters and spacing members are clamped securely in position by the annular clamping member 56 so that the cutters and spacing members are clamped securely thereagainst by the annular clamping member 56 engaging the opposite extremity of the tubular sleeve 38.

One portion of the peripheral wall of the casing member 24 is provided with a pin hinge 58 for a pin 60 which hinges an arcuate portion 62 whereby the opposite end 64 may be adjustably swung from the slicing knives 36 hereinafter described. To this end the support 65 is provided with a lug 66 and an adjusting screw 67 for effecting the adjustment. The opposite or left hand edge of the inner wall of the casing member 24 is provided with a horizontal projection or shelf 68 to which a slicing knife 69 is fixed, the knife being mounted in a suitable slot in the knife holder through the agency of a suitable fastening means. The lower face 70 of the knife support 68 provides one side of a guideway which in cooperation with a parallel face 72 of a ledge 74 of a stationary bracket 76 upon the machine forms another portion of the guideway for the slice being formed. This guideway is shown more in detail in Fig. 8 and comprises the bracket 76 having slots 80 through which the disc knives 36 are adapted to pass, the integrating portions of the block extending well toward the axis of rotation of the disc cutters and lying therebetween so as to prevent the substance being cut from passing in toward the hub of the disc cutters, at the same time forming one face 72 of a slice guideway. This slice guideway in width is slightly greater than the width of the slice being formed so as to reduce tipping to a minimum when a short slice is passing through the gang of cutters.

Under the centrifugal action of the pusher members 44 which centrifuge the potatoes or other substance endlessly about the inner wall of the casing 24, the potatoes are firmly pressed outwardly against the inner smooth surface of the casing and as they come around are sliced by the stationary slicing knife 69, the thickness being sliced depending upon the adjustment of the arcuate section 62. As the slice is being formed, it is directed between the gang of strip forming knives 36 which form the slice into a plurality of parallel relatively narrow strips, of any selected width, and due to the fact that the speed of rotation of the knives is counterclockwise and in the direction of propulsion of the strip as it is formed under the propulsion of the centrifugal force, and since the speed of these knives is regulated to grasp the strips being formed therebetween and to propel them at a somewhat greater speed than the speed effected by the centrifugal force whereby to exert a pulling effect upon the forward portion of the strips being formed and whereby to direct them into the strip forming guide 70—72. In certain instances the speed of these disc knives 36 is determined so that it is maintained exactly at the same speed at which the potato is moved, but in general the knives 36 move at a slightly greater speed such for instance as one or two per cent, whereby to help exert a pulling effect on the strips thereby helping to pull the unsevered part past the stationary slicing knife.

Disposed directly at the discharge side of the guide 70—72 is the dicing cutter. The dicing cutter 14 assembly is shown in detail in Figs. 6, 7, 8, 9, 10 and 11 and comprises a tubular spool shaped supporting frame 84 having flanged extremities 86 provided with four equally spaced threaded apertures 88. Upon the outer face of each of the flanges 86 is mounted a parallel retaining plate 89. The plate comprises a central raised portion defined by the annular shoulder 90 which is provided with a plurality of grooves 92, all of the grooves being radially annularly displaced the same distance with respect to the axis of the blade.

It is to be noted that each of the grooves 92 is of the same depth as the height of the shoulder 90, and accordingly they terminate at one end of the shoulder. At the other end the grooves 92 terminate in cylindrical apertures 94, extending completely through the plates 89.

The pair of plates 89 are bolted to the flanges 86 of the member 84 through the agency of a pair of socket head screws 96. The opposed alined slots or grooves afford supporting seats for the extremities of the knife blades 15, shown in disassembled relationship in Fig. 11. Attention is directed to the fact that each of these blades has a flat body portion 100, from the side of which the cutting blade portion 102 extends at a substantially obtuse angle. The opposite side of the flat body portion 100 terminates in a generally oppositely extending flange 104. It will be noted that while the longitudinal dimension of the body portion 100 of each knife is sufficient to permit it to extend into opposed grooves on the knife supporting head pieces 89, the flange 104 is of relatively reduced longitudinal extent so that this portion of the knife blade may be passed through the shoulder portions of the knife supporting heads to permit free insertion of any of the knife blades longitudinally of the grooves or slots without necessitating complete disassembling of the cutting units.

The blades are individually retained in operative position, as shown in Figure 7, through the agency of retaining pins 106, which have a generally cylindrical form such as to permit their ready entry in the cylindrical apertures 94. The unbroken cylindrical body of the pins is substantially the same longitudinal extent as the thickness of the plates 89, and accordingly substantially fills the apertures 94 when in the position shown in Fig. 7. The inner end of the pins is of reduced dimension, as at 108, and the pins have a flat face 110 which lies in an axially extending plane. Accordingly, when assembled in the position, the flat surfaces 110 of the pins engage behind the ends of the flanged portion of the knife blades, and since it contacts the faces of these flanges in a direction transversely to the direction of the grooves, it effectively prevents the knives from being slid outwardly of the grooves. The knives are positioned against inward radial displacement in the grooves by the angularly extending portion 104 of the knife blade which abuts the shoulder so that the blades are maintained rigidly in position. The pins are retained in place in the plates 89 by means of the retaining discs 112, secured to the outer faces of the circular plates 89 by means of the pairs of socket head cap screws 114 extending through suitable apertures in the retaining discs 112 and threaded into two of the apertures in the spool frame 84. It should be noted that the retaining discs 112 are suitably apertured to permit passage of the heads of the aforementioned cap screws 96, as well as the hubs formed on the circular knife supporting plates and being keyed to the shaft 13.

The shaft 13 as heretofore stated is driven by the smaller gear 12. The cutters just described run at a very high speed, about 1800 R. P. M., and the knives 102 are so shaped that they will not mash the cube that is sliced off each strip. The various portions of each knife are so formed that the cube when cut off will tend to slide along the center of each knife for a short distance at which time the centrifugal force acting upon the cube for about a half revolution will throw the cube outwardly from the cylinder. The second slope or portion 100 of each knife acts as a sort of buffer to stop the inward speed of the dice. This knife portion is arranged laterally of a diameter passing through the center of the axis of rotation of the knives. In other words, this knife portion presents a face at an angle so that there is no direct angle impact, but permits the cube formed to slide therealong.

The angularity of the outermost portion of each one of these knives seen in Fig. 5 is important as the angularity and the rotation of the cutter are so fixed that it will slide through the slice at the proper angle as both the slice and the knives are moving. The dices are made by the knive cutting off a piece of the strip and both moving at high speed. The speed of these knives is about the same as the speed of the impeller blades 44.

Among the advantages of the present invention is that it does not squeeze or force a slice through a cutter of the stationary device to form a dice, which operation also meshes or deforms fruit or vegetable substance. The present device is arranged to form a free cutting operation, there being a single cut at a time on the dice, except when the dice goes through the disc knives. The machine operates approximately eight times as fast as any prior construction, is simpler and has a much greater capacity for its size than any prior construction known in the art. The knives 15 are all set at an angle so that it can be run at a relatively high speed, approximately 1800 R. P. M. Utilizing centrifugal force, the device has to start at a high speed, in fact the speed has to be sufficiently high to maintain the vegetables around the top of the cylinder and also to provide such centrifugal force to maintain the vegetables against the inner peripheral wall of the cylinder as they are moved therearound by the impellers 44.

It is to be noted that the strips are fed at an angle to the axis of rotation of the dicing knives 102, which gives approximately the right degree of angle to get a right angle cut to the strip that is fed into these knives. It is also to be noted that when the strip of substance is being fed into the dicing knives 15, the momentum of the strip, effected by not only the centrifugal action, but also by the action of the disc knives 36, aids in making the correct measurement for the cutting of the next knife 15. In other words, if the knives 15 move very slowly, the strip might get out of position. For instance, if there is just a short piece left, it might slide on down into the guide before the knife arrived in cutting position. However, the momentum of the strip and the momentum of the knives are so great that this momentum force overcomes any action of gravitation. By arranging the outer angularity 102 of the knife as shown and running the knives at the proper speed, they assist in feeding the short end of the forwardly to the next succeeding knife. Hence in this manner at least for short ends the disc knives constitute means for positively feeding the short ends correctly to the dicing knives 15.

It is to be noted that suitable casing enclosures are provided not only for the power transmission from the electric motor to the various cutters, but also to the drum-like impeller 22 and in addition a suitable discharge casing is provided to receive the cubes as they are projected laterally from the disc knives 15. The force of action of these disc knives as shown in Figs. 4 and 5 effects a somewhat tangential and horizontal movement to a remote point from whence they are then discharged downwardly as at 116 into a suitable receiver.

It will also be noted that as the arcuately moving blade portion 102 cuts through the translated strip of material the associated section receiving surface, being disposed at the correct angle of inclination relatively to the cutting blade 102, forms an impactless surface along which the section is adapted to slide in a general direction away from the cutting blade 102. However, under the centrifugal force of this blade portion 102, the cut section is gradually arrested before it can impact the rearmost portion 104 of the preceding blade, and thereafter will be reversely slid along the surface 100 and projected outwardly; meanwhile, the cutters, revolving in a clockwise direction as shown in Fig. 5, will cause the diced or cut sections to be discharged substantially 180 degrees from their zone of cutting, as in the manner shown in Fig. 4.

The invention is hereby claimed as follows:

1. In a dicing machine, a slicing blade, means to direct substance to be sliced in a rotational path while under the influence of centrifugal force and for conveying said substance while under the influence of said force against said slicing blade, a gang of rotatable cutting blades arranged in planes substantially transverse to said slicing blade and being closely juxtaposed to the cutting edge of the slicing blade whereby sliced substance from the slicing blade will engage the said gang of blades while under the influence of said directing means to cause a continuous cutting action, and a set of dicing blades arranged in a plane transverse to said gang of blades, said dicing blades being operable in a path closely adjacent the gang of blades and intersecting the path of the substance discharging from said gang of blades whereby to dice strips of substance coming from said gang of blades, while supported thereby, said gang of cutting blades being configurated to grasp the sliced substance and convey it from the slicing blade while the substance is being fed to the blade by said directing means.

2. A slicing machine as defined in claim 1, including means operatively connected to said cutting blades and said substance directing means for driving said gang of rotatable cutting blades at a peripheral speed greater than the speed of said substance passing from the slicing blade whereby to tension said sliced material and draw it against said slicing blade.

3. A slicing machine as defined in claim 1, wherein said dicing blades are operatively mounted for movement in a path inclined in the direction of substance discharge where they intersect the substance discharging from the said gang of blades and including means operatively connected with said dicing blades and said gang of blades for shifting said dicing blades longitudinally of said path of substance discharge at a speed corresponding to the speed of the substance discharged from the gang of blades whereby to produce a substantially right angled severance of the substance into diced portions.

4. In a dicing machine, a dicing cutter having removable blades and comprising a pair of spaced knife supporting heads, opposed grooves on the inner faces of said knife supporting heads, a plurality of knife blades for said dicing cutter, each knife blade having its ends slidably mounted in said grooves, a flange on the knife blades and extending laterally with respect to the grooves, and a locking member disengageably mounted in the knife supporting heads and having a retaining portion adapted to register with the outer face of said flange to retain the knife blades against longitudinal displacement in the grooves, said knives being freely individually removable out of said grooves when said locking member is disengaged.

5. In a dicing machine, a dicing cutter having removable blades and comprising a pair of spaced knife supporting heads, longitudinally extending knives arranged between said heads, opposed guide means on said heads and adapted to engage said knives for slidable movement from assembled to disassembled position, an angularly disposed flange formed in a portion of the knives and in juxtaposition to at least one of said heads, and a retaining pin removably mounted in said head and adapted to engage the outer face of said flange to retain the flange in a predetermined position against said slidable movement, said knives being freely individually removable out of said knife engaging means when said pin is removed.

6. In a dicing machine, a dicing cutter having removable blades and comprising a pair of spaced knife supporting heads, opposed grooves on the inner faces of said knife supporting heads, a plurality of knife blades for said dicing cutter, each knife blade having a body portion terminating in ends adapted to register and coact with said grooves for slidable support therein, a flange on said body portion and extending at an angle to the path of said grooves, a pin slidably mounted in the knife supporting heads and having a retaining face adapted to engage the radially outer surface of said flange to retain the knife blades against outward removal in the grooves, and means releasably positioning said pin in operative knife retaining position, said releasable pin positioning means being adapted to be actuated to permit release of the pin for selectively removing the knife blades from the assembly.

7. In a machine of the class described, a cutter having removable blades and comprising a pair of spaced knife supporting heads, opposed guideways on the inner faces of said knife supporting heads, a plurality of knife blades having opposed portions slidably engageable in said guideways, each knife blade having a flange spaced from the said opposed portions of the blades to permit free, slidable movement of the blades in said guideways, and a flange engaging member adapted to be selectively engaged with said flange to retain the knife blades in operative position in the cutter, said knife blades being freely slidable from said guideways when said flange engaging member is disengaged.

8. In a dicing machine having a frame, a slicing blade, means to direct substance to be sliced in a rotational path and in a direction to force the substance against said gauging means under the influence of centrifugal force, a gang of parallel, rotatable cutting blades closely juxtaposed to the cutting edge of the slicing blade and being arranged in planes generally transverse to the plane of the slicing blade, means for rotating said gang of blades in a direction such that their peripheral points adjacent the said slicing blades move rotationally in the same direction as said slice of substance whereby the sliced substance will engage the gang of blades while under the influence of said directing means to cause a continuous cutting action, dicing blades extending generally transversely of said cutting blades and closely juxtaposed to said cutting blades, and means to move said dicing blades at their point of closest approach to the cutting blades in a direction substantially identical with the direction of movement of the substance on the cutting blades, said blade-moving means being operatively associated to convey the substance in a substantially straight path throughout the slicing, cutting and dicing operations.

9. In a device of the class described, means for repeatedly centrifuging a substance continuously in the same direction against a slicing knife to form a succession of slices, a plurality of rotatable cutting means arranged in a plane generally transverse to the plane of said slicing blade and located adjacent the slicing blade rotating at a speed slightly greater than the rate of translation of the slices as they are formed due to the centrifugal action whereby progressively to cut the slices being formed and translated into a plurality of strips, means providing a succession of knives disposed confrontingly in and to the path of translation of the strips, said knives being adapted to move transversely across said strips to cut the same into short lengths, and means arcuately to move said last mentioned series of knives at a speed greater than the speed of translation imparted to the strips by said first mentioned knives, whereby the speed of said substance as it is formed into slices and thereafter formed into cut sections is substantially maintained as it passes through the various cutting operations.

10. In a device of the class described, in combination, means for translating a strip of substance, a series of cutting blades arcuately movable at relatively high speed transversely thereof to cut said strip into a succession of relatively short sections, said blades being arranged generally parallel to the axis of rotation, and means forming a flat surface extending inwardly toward the axis of rotation of each cutting blade and arcuately movable therewith at such relatively high speed, each surface being disposed at an obtuse angle with respect to the cutting blade to receive a section as it is cut from said strip and whereby said section is adapted to decelerate along said flat surface without impacting against other angularly disposed surfaces, and whereby, under the centrifugal action imparted to said flat surface as it moves arcuately at high speed, said section is thereafter discharged from said surface in a different direction, each surface means terminating inwardly in stop means for the cut material comprising a wall projecting laterally from said surface and in a direction generally parallel to the blade.

11. In a device of the class described, in combination, means for translating a strip of substance, a series of cutting blades arcuately movable at relatively high speed transversely thereof to cut said strip into a succession of relatively short sections, said blades being arranged generally parallel to the axis of rotation and means forming a flat surface extending inwardly toward the axis of rotation of each cutting blade and arcuately movable therewith at such relatively high speed, each surface being disposed at an obtuse angle with respect to the cutting blade to receive a section as it is cut from said strip and whereby said section is adapted to decelerate along said flat surface without impacting against other angularly disposed surfaces, and whereby, under the centrifugal action imparted to said surface as it moves arcuately at high speed, said section is thereafter reversely moved along said flat surface and discharged remotely therefrom, each surface means terminating inwardly in stop means for the cut material comprising a wall projecting laterally from said surface and in a direction generally parallel to the blade.

12. In a device of the class described, in combination, means for translating a strip of substance, a blade acting under centrifugal force and adapted to cut across said strip and to sever a short section therefrom, said blade being arranged generally parallel to the axis of rotation and means forming a section receiving surface moving with said blade, a portion at least of which extends inwardly toward the axis of rotation at an obtuse angle to the blade to cause said section to move relatively therealong with gradually diminishing speed and stop and thereafter, under the centrifugal force of said surface, to move with gradually increasing speed in a reverse direction therealong and to be discharged from said surface at a point remote from where said section first contacted said surface, each surface means terminating inwardly in stop means for the cut material comprising a wall projecting laterally from said surface and in a direction generally parallel to the blade.

13. In a device of the class described, in combination, means for centrifuging substance at relatively high speed against a slicing blade to form a slice and to translate the slice at a relatively high speed, rotary slicing means movable at a speed at least equal to the speed of the slice and adapted to contact the slice to cut it into strips and to move said slice at the speed of the cutting knives, means for cutting each strip into short sections as said strip is moving, and means for centrifuging said sections away from the zone of cutting to discharge them from said last named cutting means.

14. In a device of the class described, in combination, means for feeding a strip of substance along a predetermined path, arcuately moving cutting means for successively cutting said strip into a series of short sections, and means for centripetally moving said sections in a direction gradually to decrease their speed to prevent impact and thereafter for centrifuging said sections in a reverse direction to discharge them.

15. In a device for cutting strip material, in combination, means for translating a strip of material along a predetermined path at a relatively high speed, a rotating series of cutters having a series of cutting blades spaced apart in the periphery thereof and adapted arcuately to move across the path of translation of the strip and to cut the strip into a series of relatively short sections, said blades being arranged generally parallel to the axis of rotation, a surface having a portion at least disposed angularly with respect to each cutting blade and extending inwardly toward the axis of rotation of said blades and adapted to receive a section cut by said blade slidably thereon in a manner such as to arrest further movement of said cut section therealong and whereby, under the centrifugal action of said surface, to propel said section therealong in a reverse direction as said cutter is moved arcuately in a direction away from the zone of cutting, and whereby to discharge the cut section therefrom and from said cutting blade in a direction substantially 180 degrees away from the zone of cutting, each said surface means terminating inwardly in a laterally extending flange disposed in a plane substantially parallel to the plane of the cutting blade and forming a stop for the cut material.

16. In a dicing machine, a stationary slicing blade, means to move substance at a relatively high velocity against said blade to produce a slice therefrom travelling at a relatively high rate of speed, a gang of rotatable cutting blades rotatable about a fixed axis and at a relatively high rate of speed and arranged in planes substantially transverse to the plane of the slicing blade in substantially contiguous juxtaposition to said slicing blade and adapted to sever the said moving slices into a plurality of strips, the gang of rotatable blades having a peripheral section sufficiently closely positioned with respect to the said slicing blade at a point approaching substantial tangency so that the forward free end of said slice is contacted by said rotatable blades while being fed into cutting relationship with said gang of cutting blades, drive means for said gang of blades, for rotating the said peripheral portion said rotatable blades adjacent the slicing blade in a direction away from the edge of said slicing blade, said drive means being operable to drive the said portion of the cutting blades in a direction and at a speed at least substantially equivalent to the direction of feed and speed of the slice under the influence of said slice moving means for conveying the sliced substance away from the stationary slicing blade, a high speed dicing cutter rotatably mounted about a fixed axis and positioned operatively adjacent the discharge portion of said rotatable cutting blades for dicing the substance fed thereby, and means for arcuately moving said dicing cutter at a rate of speed at least equal to the speed of said rotatable cutting blades.

17. In a dicing machine, a slicing blade, means to move substance at high speed against said blade to produce slices therefrom travelling at relatively high speed in a predetermined direction, a gang of rotatable cutting blades arranged in planes transversely to the plane of the slicing blade and disposed with one peripheral portion in substantially contiguous juxtaposition to said blade and adapted to sever the said slices into a plurality of strips, means operatively connected to the said moving means to drive the cutting blades at high speed constantly in one direction and in such a direction that their peripheral portions most closely approaching the said slicing blade move in a direction away from the cutting edge of the slicing blade and at a rate greater than the speed of movement of the slices and also to convey the sliced substance from the slicing blade substantially at such maintained speed, rotatable dicing cutters disposed in the path of projection of said strips to cut the same into short strips, and means to rotate said dicing cutters constantly in the same direction at a speed at least equal to the speed of translation of the strip and in the same general direction as the direction of movement of the strips.

18. In a device of the class described, means for centrifuging at high speed a vegetable or fruit against a stationary slicing knife to form a slice, a gang of knives rotating constantly in the same direction at a speed slightly greater than the speed of translation of the slice as it is formed under the centrifugal action, whereby to cut the slice formed into a plurality of strips, and means providing a succession of rotary knives disposed confrontingly to the path of translation of the strips and adapted to move transversely across said strips to cut the same into short sections, means to rotate said last-mentioned series of knives constantly in the same direction at a speed at least as great as the speed of translation of the strips discharging from said first-mentioned rotating knives.

19. In a device of the class described, in combination, means for translating a strip of substance at relatively high speed, and successive cutting means movable successively across said translated strip at relatively high speed to cut short sections therefrom, each of said cutting means moving at least at the speed of said translated strip and each having a section receiving surface located on the same side of the cutting means as the said short sections and movable therewith and disposed at an obtuse angle relatively to the direction of movement of said cutting means slidably to receive said cut sections when severed, each said surface moving with sufficient speed and being so angularly disposed as to cause gradually arrested movement in one direction of said section received thereon and thereafter to cause said section to move in a different direction for discharging the same from the zone at which it was cut said cutting means being disposed at substantially right angles to its direction of movement and said section receiving means terminating in a laterally bent wall disposed generally parallel to the path of the cutting means and operable to form a stop for the cut material.

20. In a dicing machine, a slicing blade, means to direct substance to be sliced against the blade in a direction substantially parallel to the plane of the blade, a gang of parallel rotatable cutting blades operatively arranged in planes generally transverse to the plane of said slicing blade and being mounted with one peripheral portion approaching substantial tangency with the plane of said slicing blade, means operatively connected with said substance directing means for rotating the said peripheral portions of said gang of blades in substantially the same direction and at a speed greater than said sliced substance whereby the sliced substance will engage the gang of blades while under the influence of said directing means to cause a continuous cutting action, dicing blades extending generally transversely of said cutting blades and closely juxtaposed to said cutting blades and means to move said dicing blades at their point of closest approach to the cutting blades in a direction substantially identical with the direction of movement of the substance on the cutting blades, said blade moving means being operatively associated to convey the substance in a substantially straight path throughout the slicing, cutting and dicing operations.

21. A dicing machine as defined in claim 20 wherein said gang of rotatable cutting blades are disposed with the said peripheral portions adjacent the slicing blade and inwardly beyond the cutting edge thereof and wherein the means for rotating the gang of cutting blades continuously rotates said cutting blades in a direction such that the said peripheral portions move rotationally away from the said cutting edge.

22. In a device of the class described, in combination, means for feeding a strip of substance at relatively high speed, cutting means mounted for relative movement across the strip for successively cutting said strip into a series of short sections, and receiving means operatively associated with the cutting means and movable therewith disposed at an acute angle of inclination with respect to said strip during cutting for receiving said sections without impact and for conveying said sections away and discharging them from said cutting zone, said receiving means terminating in a flanged portion projecting laterally from the plane thereof and extending generally parallel to the path of movement of the cutting means for forming a stop for the cut material, said cutting means extending at substantially right angles to its direction of movement.

WILLIAM E. URSCHEL.
JOE RICHARD URSCHEL.

CERTIFICATE OF CORRECTION.

Patent No. 2,242,557. May 20, 1941.

WILLIAM E. URSCHEL, ET AL.

It is hereby certified that error appears in the printed specification of the above numbered patent requiring correction as follows: Page 3, second column, line 55, for the word "meshes" read --mashes--; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.